United States Patent
Zhao

(10) Patent No.: US 8,248,020 B2
(45) Date of Patent: Aug. 21, 2012

(54) STARTING CIRCUIT FOR SINGLE-PHASE AC MOTOR

(75) Inventor: Yong Zhao, Zhongshan (CN)

(73) Assignee: Zhongshan Broad-Ocean Motor Co., Ltd., Zhongshan (CN)

( * ) Notice: Subject to any disclaimer, the term of this patent is extended or adjusted under 35 U.S.C. 154(b) by 350 days.

(21) Appl. No.: 12/726,507

(22) Filed: Mar. 18, 2010

(65) Prior Publication Data

US 2010/0270966 A1    Oct. 28, 2010

(30) Foreign Application Priority Data

Apr. 27, 2009    (CN) .................. 2009 2 0055886 U

(51) Int. Cl.
*H02P 1/26* (2006.01)
(52) U.S. Cl. ................. 318/772; 318/753; 318/786
(58) Field of Classification Search .......... 318/772, 318/753, 786, 778, 430, 787, 788, 789, 774, 318/801, 808

See application file for complete search history.

(56) References Cited

U.S. PATENT DOCUMENTS

2011/0193511 A1* 8/2011 Zhao .................. 318/786
* cited by examiner

*Primary Examiner* — Karen Masih
(74) *Attorney, Agent, or Firm* — Matthias Scholl P.C.; Matthias Scholl

(57) ABSTRACT

A starting circuit for a single-phase AC motor, consisting at least of a rectifying and voltage-stabilizing circuit, a control circuit with a zero-cross detecting circuit and a counter, and a bidirectional thyristor. The bidirectional thyristor is serially connected to a starting winding and a starting capacitor, the bidirectional thyristor, the starting winding and the starting capacitor are connected a utility power AC input. The input end of the rectifying and voltage-stabilizing circuit is connected to the utility power AC input. The output end of the rectifying and voltage-stabilizing circuit supplies power to the control circuit. The input end of the zero-cross detecting circuit is connected to the utility power AC input. The output end of the zero-cross detecting circuit is connected to the input end of the counter.

10 Claims, 3 Drawing Sheets

STARTING CIRCUIT FOR SINGLE-PHASE AC MOTOR

CROSS-REFERENCE TO RELATED APPLICATIONS

Pursuant to 35 U.S.C. §119 and the Paris Convention Treaty, this application claims the benefit of Chinese Patent Application No. 200920055886.4 filed on Apr. 27, 2009, the contents of which are incorporated herein by reference.

BACKGROUND OF THE INVENTION

1. Field of the Invention

The invention relates to a starting circuit, and more particularly to a starting circuit for a single-phase AC motor.

2. Description of the Related Art

Single-phase AC motors are widely used nowadays. A conventional starting circuit of the single-phase AC motor comprises a current-measuring circuit, a rectifying circuit, a comparing circuit, and a bidirectional thyristor. However, there are several problems with the starting circuit: control thereof is difficult, circuit structure thereof is complex, and production cost thereof is high.

SUMMARY OF THE INVENTION

In view of the above-described problem, it is one objective of the invention to provide a starting circuit for a single-phase AC motor that features easy control, simple structure, and low production cost.

To achieve the above objectives, in accordance with one embodiment of the invention, provided is a starting circuit for a single-phase AC motor, comprising a rectifying and voltage-stabilizing circuit, a control circuit comprising a zero-cross detecting circuit and a counter, and a bidirectional thyristor. The bidirectional thyristor is serially connected to a starting winding and a starting capacitor, the bidirectional thyristor, the starting winding and the starting capacitor are connected a utility power AC input, an input end of the rectifying and voltage-stabilizing circuit is connected to the utility power AC input, an output end of the rectifying and voltage-stabilizing circuit operates to supply power to the control circuit, an input end of the zero-cross detecting circuit is connected to the utility power AC input, an output end of the zero-cross detecting circuit is connected to an input end of the counter, the zero-cross detecting circuit operates to detect zero crossing points of the utility power AC input, and to input the zero crossing points to the counter, and the counter operates to trigger a signal whereby controlling the bidirectional thyristor as the total number of the zero crossing points reaches a predetermined value.

In a class of this embodiment, the zero-cross detecting circuit comprises a first resistor R1, a second resistor R2, a third resistor R3, a triode Q1.

In a class of this embodiment, the first resistor R1 and the second resistor R2 are serially connected altogether and then to the utility power AC input.

In a class of this embodiment, a base electrode of the triode Q1 is connected between the first resistor R1 and the second resistor R2.

In a class of this embodiment, the third resistor R3 is connected to one end of a power supply.

In a class of this embodiment, an emitting electrode of the triode Q1 is connected to the other end of the power supply.

In a class of this embodiment, a photoelectric-isolating and driving circuit is disposed between the counter and the bidirectional thyristor.

In a class of this embodiment, a protecting circuit is parallel connected to the bidirectional thyristor.

In a class of this embodiment, the protecting circuit comprises a capacitor C4 and a fourth resistor R1 serially connected altogether.

In a class of this embodiment, the predetermined value is adjustable.

Advantages of the invention comprise: 1) the invention features simple circuit structure, small components and low production cost; 2) the invention features easy control, during starting of the motor, a main winding and the starting winding operate simultaneously, the bidirectional thyristor is switched on, and the counter outputs a high-level signal to the control end of the bidirectional thyristor; meanwhile, the zero-cross detecting circuit inputs the zero crossing points to the counter, the counter triggers a low-level signal whereby controlling the bidirectional thyristor to switch off and enabling the starting winding to stop operating as the total number of the zero crossing points reaches a predetermined value; 3) the invention is safe and reliable, the photoelectric-isolating and driving circuit disposed between the counter and the bidirectional thyristor separates a heavy-current portion from a weak-current portion; 4) the invention features convenient use, the predetermined value of the counter is adjustable, and thus turn-on time of the bidirectional thyristor and operation time of the starting winding are controllable.

BRIEF DESCRIPTION OF THE DRAWINGS

Detailed description will be given below in conjunction with accompanying drawings, in which.

DETAILED DESCRIPTION OF THE EMBODIMENTS

Figure 1:
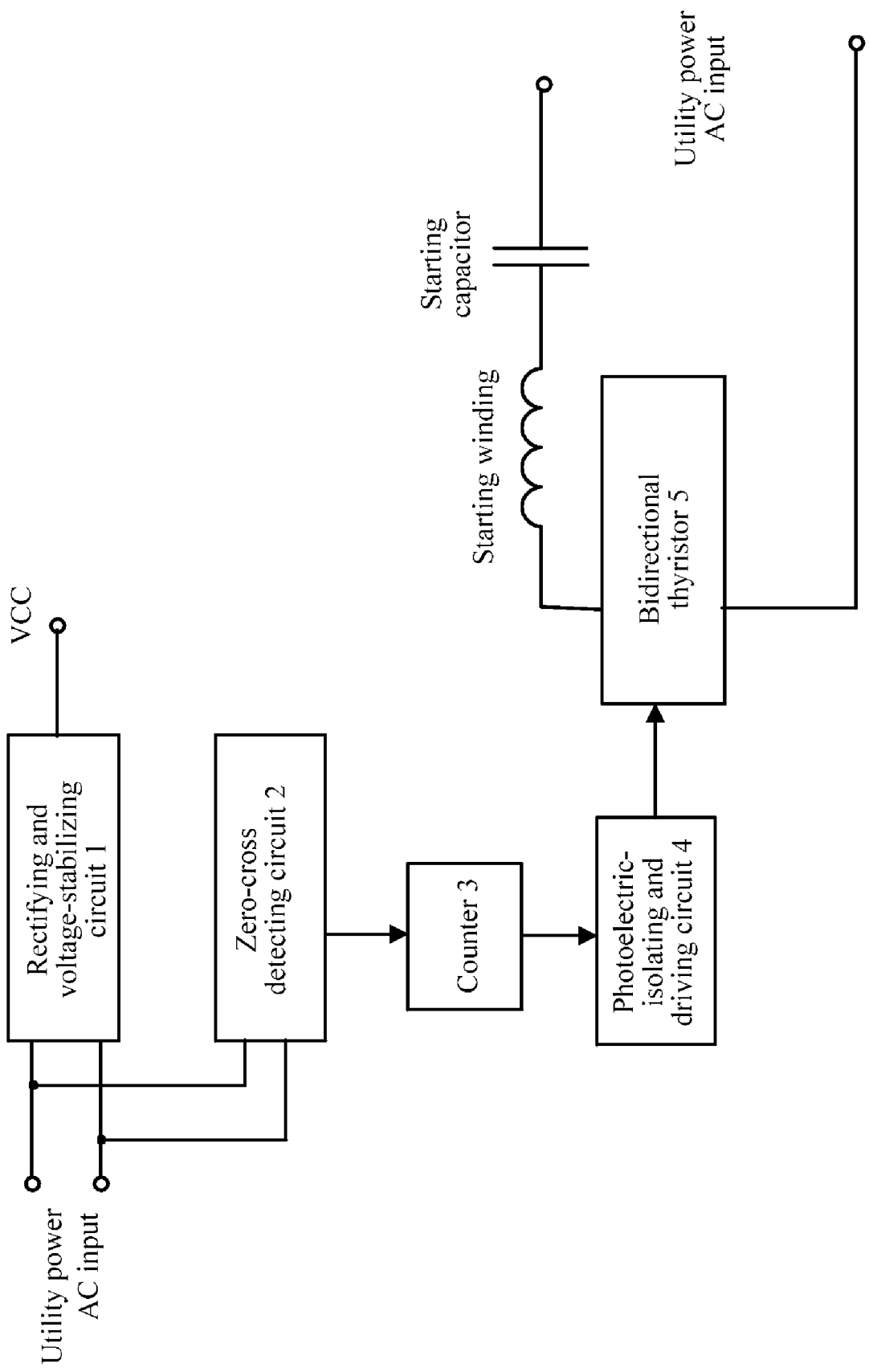
FIG. 1 is a block diagram of a starting circuit for a single-phase AC motor of an embodiment of the invention.
Figure 2:
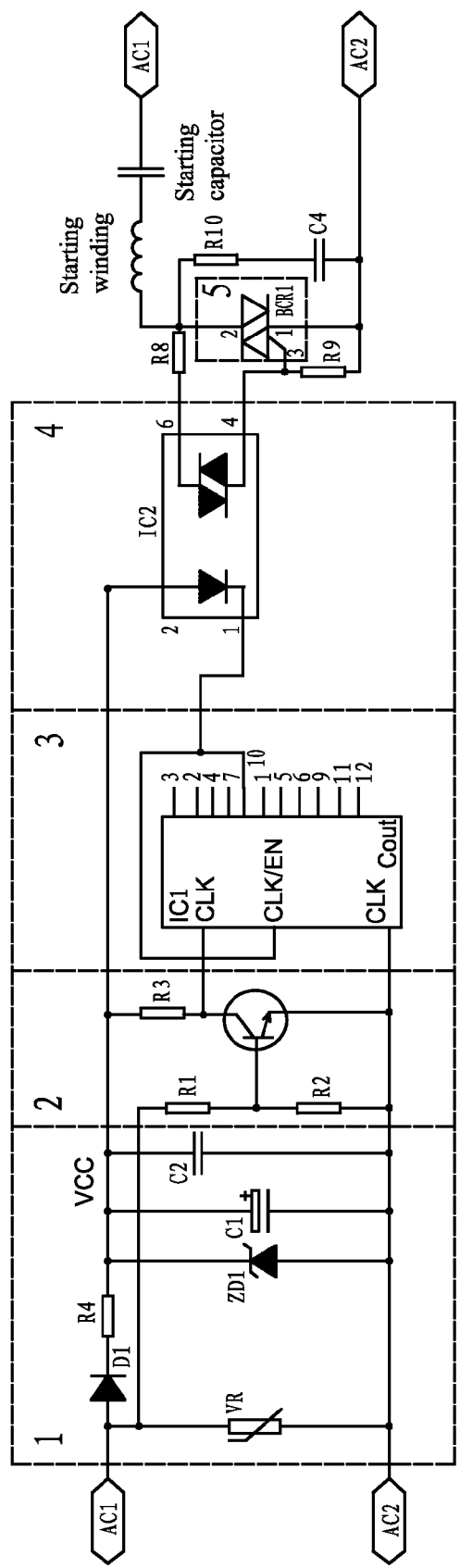
FIG. 2 is a schematic diagram of the starting circuit in FIG. 1.

As shown in FIGS. 1 and 2, a starting circuit for a single-phase AC motor of the invention comprises a rectifying and voltage-stabilizing circuit 1, a control circuit, and a bidirectional thyristor 5.

The bidirectional thyristor 5 is serially connected to a starting winding and a starting capacitor, the bidirectional thyristor 5, the starting winding and the starting capacitor are connected a utility power AC input.

An input end of the rectifying and voltage-stabilizing circuit 1 is connected to the utility power AC input, and an output end of the rectifying and voltage-stabilizing circuit 1 operates to supply power to the control circuit.

The control circuit comprises a zero-cross detecting circuit 2 and a counter 3.

The zero-cross detecting circuit 2 comprises a first resistor R1, a second resistor R2, a third resistor R3, a triode Q1. The first resistor R1 and the second resistor R2 are serially connected altogether and then to the utility power AC input. A base electrode of the triode Q1 is connected between the first resistor R1 and the second resistor R2. The third resistor R3 is connected to one end of a power supply, and an emitting electrode of the triode Q1 is connected to the other end of the power supply.

An input end of the zero-cross detecting circuit 2 is connected to the utility power AC input, and an output end of the zero-cross detecting circuit 2 is connected to an input end of the counter 3.

The zero-cross detecting circuit 2 operates to detect zero crossing points of the utility power AC input, and to input the zero crossing points to the counter 3.

The counter 3 operates to trigger a signal whereby controlling the bidirectional thyristor 5 as the total number of the zero crossing points reaches a predetermined value. The predetermined value is adjustable.

A photoelectric-isolating and driving circuit 4 is disposed between the counter 3 and the bidirectional thyristor 5.

A protecting circuit is parallel connected to the bidirectional thyristor 5, and comprises a capacitor C4 and a fourth resistor R1 serially connected altogether.

Figure 3:
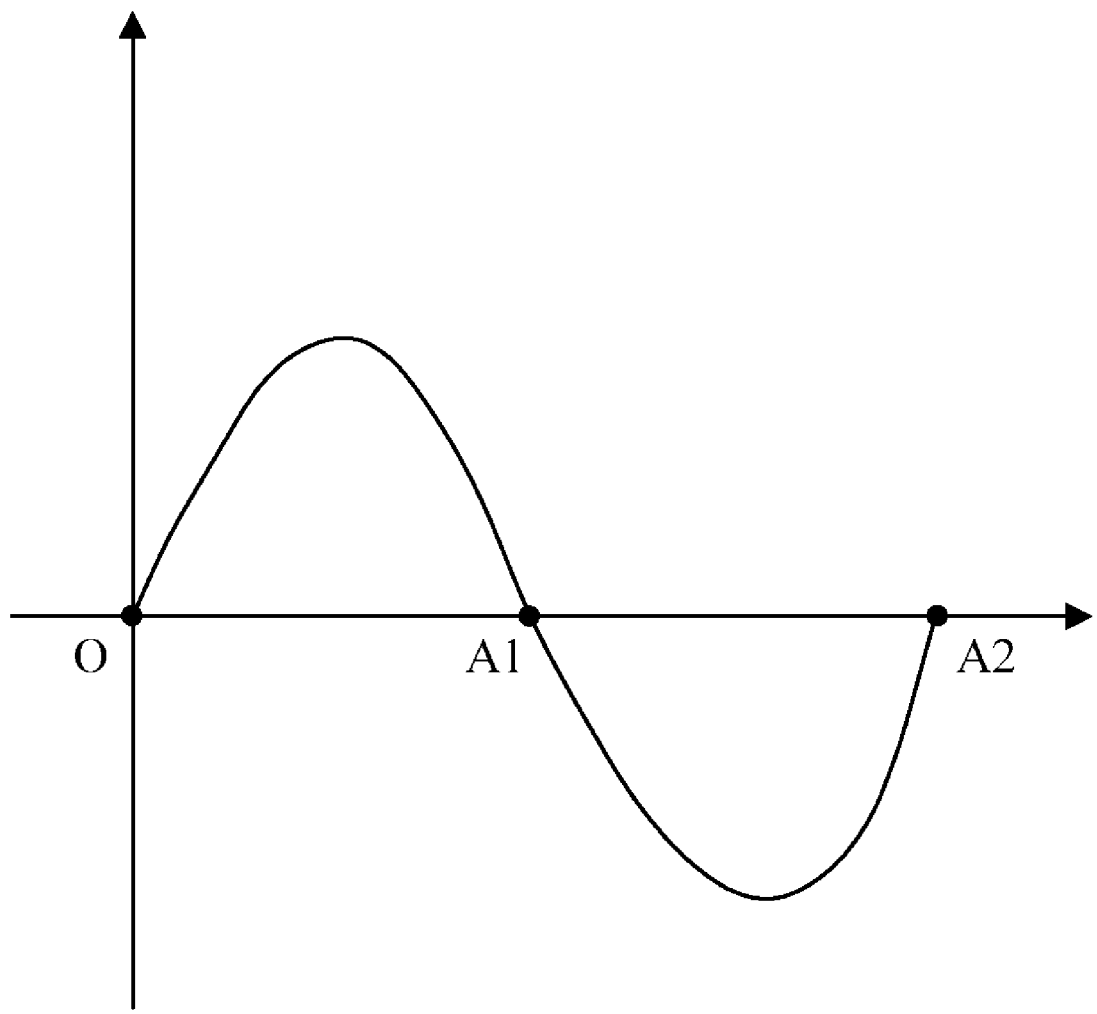
FIG. 3 is a waveform graph of a utility power AC input.

Operation principle of the invention is as follows:

As the single-phase AC motor is powered on and started, the bidirectional thyristor 5 is switched on, and the zero-cross detecting circuit 2 inputs zero crossing points of the utility power AC input to the counter 3. As shown in FIG. 3, the utility power AC input is a sine wave signal with a frequency of 50 Hz and a wave period of 0.02 s. The number and time of a waveform can be determined by detecting zero crossing points A1 and A2. The zero-cross detecting circuit 2 inputs zero crossing points of the utility power AC input to the counter 3. The counter 3 triggers a signal whereby controlling the bidirectional thyristor 5 to switch off and enabling the starting winding to stop operating as the total number of the zero crossing points reaches a predetermined value. The predetermined value is adjustable, which makes the invention applicable for single-phase AC motors with different parameters.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A starting circuit for a single-phase AC motor, comprising
   a rectifying and voltage-stabilizing circuit;
   a control circuit comprising a zero-cross detecting circuit and a counter; and
   a bidirectional thyristor;
   wherein
   said bidirectional thyristor is serially connected to a starting winding and a starting capacitor;
   said bidirectional thyristor, said starting winding and said starting capacitor are connected a utility power AC input;
   an input end of said rectifying and voltage-stabilizing circuit is connected to said utility power AC input;
   an output end of said rectifying and voltage-stabilizing circuit operates to supply power to said control circuit;
   an input end of said zero-cross detecting circuit is connected to said utility power AC input;
   an output end of said zero-cross detecting circuit is connected to an input end of said counter;
   said zero-cross detecting circuit operates to detect zero crossing points of said utility power AC input, and to input said zero crossing points to said counter; and
   said counter operates to trigger a signal whereby controlling said bidirectional thyristor as the total number of said zero crossing points reaches a predetermined value.

2. The starting circuit of claim 1, wherein said zero-cross detecting circuit comprises a first resistor R1, a second resistor R2, a third resistor R3, a triode Q1.

3. The starting circuit of claim 2, wherein said first resistor R1 and said second resistor R2 are serially connected altogether and then to said utility power AC input.

4. The starting circuit of claim 2, wherein a base electrode of said triode Q1 is connected between said first resistor R1 and said second resistor R2.

5. The starting circuit of claim 2, wherein said third resistor R3 is connected to one end of a power supply.

6. The starting circuit of claim 5, wherein an emitting electrode of said triode Q1 is connected to the other end of said power supply.

7. The starting circuit of claim 1, wherein a photoelectric-isolating and driving circuit is disposed between said counter and said bidirectional thyristor.

8. The starting circuit of claim 1, wherein a protecting circuit is parallel connected to said bidirectional thyristor.

9. The starting circuit of claim 8, wherein said protecting circuit comprises a capacitor C4 and a fourth resistor R1 serially connected altogether.

10. The starting circuit of claim 1, wherein said predetermined value is adjustable.

* * * * *